May 1, 1962
R. W. FICKLIN
3,032,069
PIPELINE SHUT-OFF DEVICE
Filed April 14, 1958
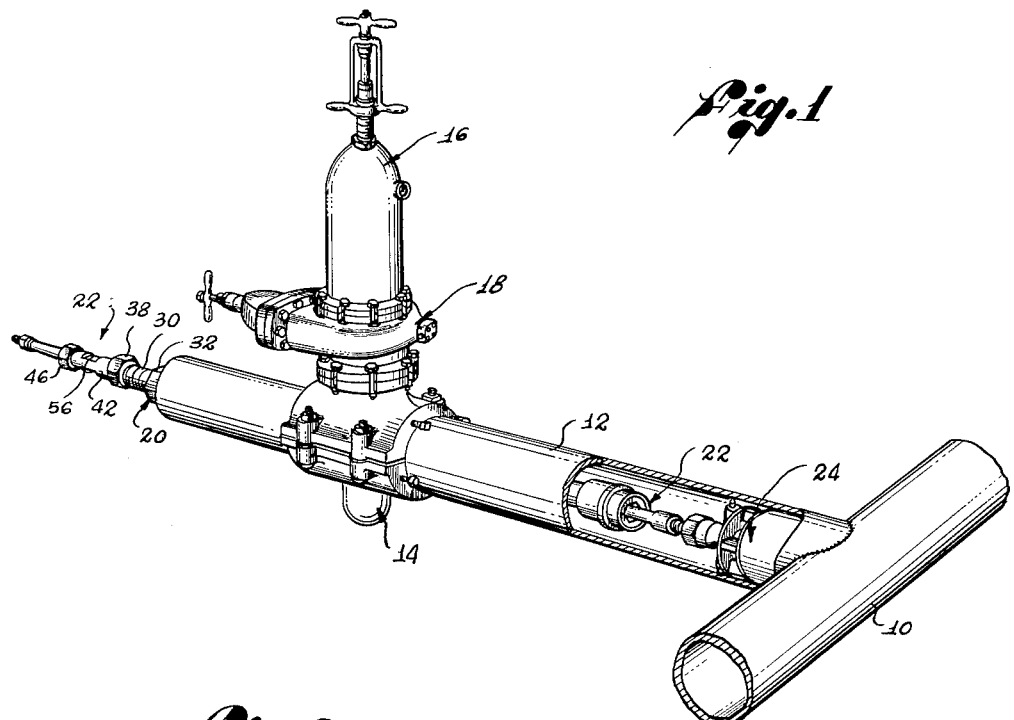
Fig. 1
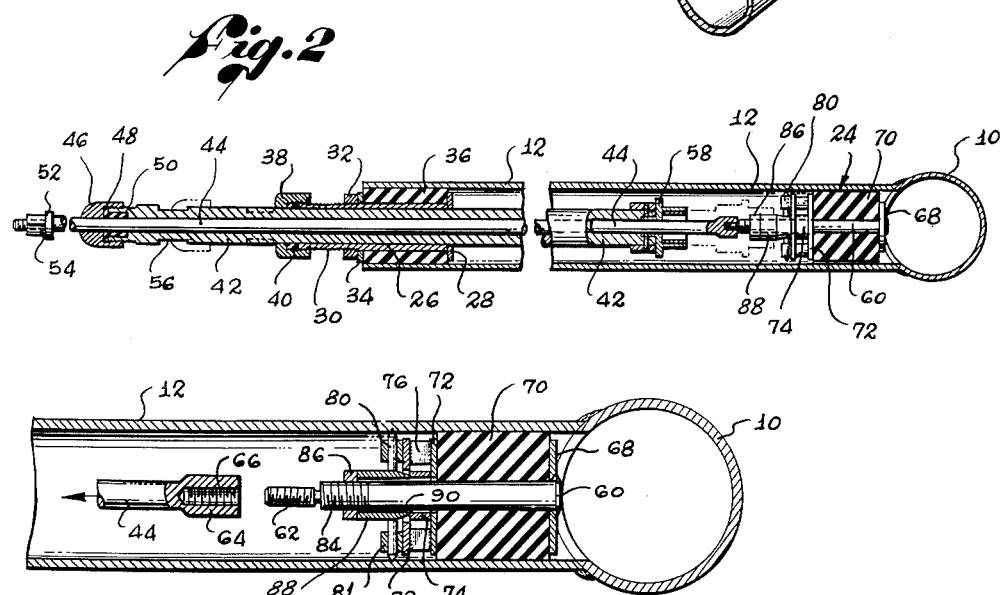
Fig. 2
Fig. 3
INVENTOR.
RAYMOND W. FICKLIN
BY
Attorneys United States Patent Office 3,032,069
Patented May 1, 1962

3,032,069
PIPELINE SHUT-OFF DEVICE
Raymond W. Ficklin, Long Beach, Calif., assignor of one-half to Jack M. Wilantt, Long Beach, Calif.
Filed Apr. 14, 1958, Ser. No. 728,272
4 Claims. (Cl. 138—89)

The present invention relates generally to pipeline shut-off devices, and more particularly, to a device of this character adapted to shut off a pipeline at a position upstream from a fitting which is to be removed from the pipeline.

When the occasion arises for abandonment of a pipeline, particularly buried lines, it frequently happens that valuable fittings of different types which are incorporated in the line are abandoned along with the line. Usually such fittings are not of sufficient value in and of themselves to warrant making and closing a hole in the ground solely for the purpose of recovering the fittings. However, these fittings do have a definite salvage value so that it is important to retrieve the fitting from the line, if this can be done concurrently with the other operations involved in abandonment of the line, during such time as the buried line is exposed. For this purpose, I have devised the present invention which can be utilized to readily and quickly shut off the line upstream from the fitting to permit the fitting to be salvaged. It will be apparent, however, to those skilled in the art that my pipeline shut-off device can be utilized also in those situations merely calling for a temporary shut-off of the line, i.e., where a stopper is temporarily inserted in the line and retrieved after it has served its purpose.

A further object of the present invention is to provide a pipeline shut-off device adapted for insertion in an open end of the line on the downstream side of a fitting, and having a stopper assembly advanceable through the fitting to an upstream poistion. A means operable from the downstream end of the device serves to install the stopper assembly in fluid sealing engagement with the line to remain thus installed temporarily or permanently, as desired, whereby the fitting can be retrieved from the line.

Another object of my invention is to provide a pipeline shut-off device having an improved detachable connection between a stopper assembly and its actuating mechanism whereby the stopper assembly is securely held in place during expansion of the stopper into fluid-sealing engagement with the pipeline.

Yet another object of my invention is to provide a pipeline shut-off device that can be supported in operative position in the line without the utilization of any threaded or other special fittings. For this purpose, I have devised a plug assembly adapted for temporary fluid-sealing mounting in a position downstream from the fitting, and adapted to slidably support the actuating mechanism of the device during installation of the stopper and subsequent withdrawal of the actuating mechanism.

Yet another object of my invention is to provide a pipeline shut-off device utilizing an actuating mechanism which is usable with plug assemblies and stopper assemblies of different sizes, conforming to the size of the pipeline to be abandoned.

A still further object of my invention is to provide in a pipeline shut-off device and in a stopper assembly a cam actuated means forcefully engageable with the pipeline along with expansion of a stopper for the purpose of holding the stopper assembly against angular or linear displacement during the installation operation.

These and other objects and advantages of the invention will be apparent from the following description of a presently preferred embodiment thereof, when taken in conjunction with the annexed drawing, in which:

FIGURE 1 is a partial perspective view of a pipeline system with portions of a branch line being cut away to show the manner of use of a preferred embodiment of my invention in installing a stopper assembly in the branch line;

FIGURE 2 is a longitudinal, sectional view through the axis of the shut-off device shown in FIGURE 1, with the device in operative position within a branch pipeline; and FIGURE 3 is a partial, longitudinal sectional view on enlarged scale showing a stopper assembly in expanded position for fluid-sealing engagement with a pipe and the actuating mechanism withdrawing from the stopper assembly.

Referring to FIGURE 1 of the drawings, there is shown a part of the pipeline system including a header 10 with a branch line 12 which is to be abandoned. A fitting, designated generally by the numeral 14, is mounted in the branch line 12 at a position downstream from the header 10. The fitting 14 illustrated is of the type known as a stopper fitting which can be opened and closed by use of a stopping machine 16 illustrated as being mounted on top of a gate valve 18 mounted on top of fitting 14, the whole being used for the aforesaid opening and closing of the stopper fitting 14. It is to be understood, however, that the fitting 14 is merely illustrative of fittings which can be salvaged by the use of my pipeline shut-off device. The fitting could equally well be a pressure control fitting, or a valve, or one of a large number of other devices which will permit the passage of my shut-off device therethrough. Such devices are openable and closeable of themselves or by means of auxiliary apparatus, such as the stopper machine 16 and gate valve 18 illustrated in FIGURE 1.

After a hole has been made in the ground to expose the branch line 12 which is to be abandoned, the stopper fitting 14 is closed by the use of the stopper machine 16 and gate valve 18. A method of accomplishing this is illustrated in Mueller Catalogue No. 50, published in 1947 by the Mueller Company of Decatur, Illinois. After closure of the fitting 14, a section of branch line 12 downstream from the fitting is removed. The shut-off device embodying the present invention can then be used for shutting off the branch line 12 at a position upstream from fitting 14 to thereafter permit removal of the fitting 14, or the section of branch line 12 on which the fitting is mounted.

In general, my invention includes a plug assembly 20 for mounting the shut-off device through the open end of branch line 12, an actuating mechanism 22 movably mounted in plug assembly 20, and a stopper assembly 24 detachably connected to the inner or upstream end of the actuating mechanism, the actuating mechanism being adapted to push the stopper assembly 24 to a position upstream of the fitting 14, and to install the stopper assembly in such position. The plug assembly 20 and stopper assembly 24 are available in a variety of sizes corresponding to the interior dimensions of the pipelines in which the shut-off device is to be used. The actuating mechanism 22 is adapted for use with plug assemblies 20 and stopper assemblies 24 of different sizes.

The plug assembly 20 includes an actuator receiving sleeve 26, having an annular plate 28 welded or otherwise affixed to one end of the sleeve to provide a fixed abutment member. The other end portion 30 of the sleeve is exteriorly threaded for mounting a plug expansion nut 32. A washer 34 is slidably mounted on the sleeve 26 between the nut 32 and the end plate 28 to be driven towards the end plate upon rotation of the nut 32 in the appropriate direction. A tubular plug 36 is coaxially mounted on the sleeve 26 between the washer 34 and the end plate 28. This plug is preferably made of a resilient or elastomeric material such as rubber or neoprene that upon opposite relative movement of the washer 34 and end plate 28 is compressed and expanded into fluid sealing engagement with the inner wall of the line 12, thus effecting a partial seal at the open end of the line 12.

The plug assembly 20 also includes a packing nut 38 mounted on the threaded end portion 36 of the sleeve 26. Contained in an annular cap portion of the packing nut 38 is a ring of packing material 40 adapted to be compressed against the end of sleeve 26 upon rotation of the nut 38 in a tightening direction. An elongate drive tube 42 of the actuating mechanism 22 is slidable through the packing material 40, the sleeve 26, and the end plate 28, and the escape of fluid in the branch line 12 around the drive tube 42 is prevented by the packing 40.

The actuating mechanism 22 generally comprises the drive tube 42 and a rod 44 telescopically mounted in the drive tube 42 and of greater length than the drive tube. In order to effect a fluid seal between the rod 44 and drive tube 42, a cap nut 46 adapted to slidably receive the rod 44 through its head, is threadedly mounted on the downstream or outer end of the drive tube 42. The threaded cavity of the cap nut 46 contains an axially elongated ring of packing material 48 and in order to insure a perfect seal between the drive tube 42 and rod 44 this material 48 is compressed upon tightening of the nut 46 into a counterbore 50 formed in the end of the drive tube 42.

The actuating mechanism 22 and plug assembly 20 after installation in the aforedescribed manner define a total fluid seal in the open end of the branch line 12. Accordingly, the stopper machine 16 can now be utilized to open the fitting 14 in order to permit passage of stopper assembly 24 to an installation position upstream from the fitting 14.

Assuming the fitting 14 to be now open, both the drive tube 42 and rod 44 are pushed upstream through the plug assembly 20 to move the stopper assembly 24 to the desired installation position. Although in use the stopper assembly 24 is hidden from view, its position can be accurately ascertained by measuring the extent to which the rod 44 is moved into the plug assembly 20. It will be observed that the outer downstream end of the rod 44 is threaded and mounts a lock nut 52 under another nut 54. These nuts afford a means of rotating the rod 44 relative to the drive tube 42, but for present purposes it should be observed that in moving the rod 44 and drive tube 42 upstream that the lock nut 52 serves as a stop for abutment against the cap nut 46. This arrangement serves to locate the drive tube 42 and rod 44 in the correct relative position and also prevents inadvertent movement of the outer end of the rod 44 inwardly of the drive tube 42. Similarly the cap nut 46 will abut the plug assembly nut 38 to prevent inadvertent movement of the drive tube 42 completely into the plug assembly. However, when the drive tube 42 is in operative position, as indicated in dotted outline in the left-hand portion of FIGURE 2, the cap nut 46 will be spaced apart from the nut 38 in order to provide access to a wrench flat 56 formed on the drive tube by means of which the drive tube 42 can be rotated to effect installation of the stopper assembly 24.

When the lock nut 52 of rod 44 abuts the cap nut 46 of the drive tube 42, the longer rod 44 extends upstream beyond the upstream or forward end of the drive tube 42. The stopper assembly 24 detachably connected to the end of rod 44 is thus spaced a predetermined distance apart from a socket wrench 58 rigidly affixed to the upstream end of the drive tube 42. Therefore, after the stopper assembly 24 has been moved to the desired position by the rod 44, if the rod be held against further axial movement while the drive tube 42 is advanced upstream for said predetermined distance, the user of the device can determine when the socket 58 is in operative association with the stopper assembly 24 by gauging such predetermined distance along the exposed end of rod 44.

The stopper assembly 24 includes a central mounting shaft 60 which is a solid member of step-screw configuration at its rear or downstream end. The reduced diameter extreme rear-end portion 62 of the shaft 60 is left-hand threaded for screw engagement with a left-hand tapped bore 66 formed in an up-set front end 64 of the rod 44. The stopper assembly 24 and rod 44 are thus detachably connected, and when the stopper assembly is held against rotation, the two parts can be disconnected by right-hand turning of the rod 44.

An annular end plate 68 is welded or otherwise rigidly affixed to the front or upstream end of the shaft 60 to provide one abutment member. A tubular stopper 70 is coaxially mounted on the shaft 60 behind the plate 68, and is compressable and expandable into fluid-sealing engagement with the shaft 60 and with the branch line 12 by opposite relative movement of the plate 68 and another abutment member 12 concentrically mounted on shaft 60 behind the stopper 70. As can be seen by reference to FIGURE 3, the central opening of the abutment 72, through which the shaft 60 passes, is of greater diameter than the shaft 60, and on its rear face concentrically rigidly mounts a cylindrical spacer 74 having the same internal diameter as the diameter of the central opening of abutment 72. Also rigidly affixed to the rear face of abutment 72 are a plurality of spacer plates 76 of the same length as spacer 74 for rigidly mounting a concentric anchor assembly ring 78. A plurality of radially disposed anchor pins 80 are radially slidably mounted on the anchor ring 78 in sleeves 81 welded to the rear face of the anchor ring.

The shaft 60 on its normal diameter portion immediately adjacent the left-hand threaded portion 62 is formed with a right-hand threaded portion 84 for mounting an actuating nut 86. Slidably mounted on shaft 60 in front of the actuating nut 86 is a tubular cam member 88 formed with a conical surface 90 on its forward end adapted to extend through the central opening of anchor ring 78. Before insertion of the stopper assembly 24 into the branch line 12, the actuating nut 86 and cam member 88 are spaced to the rear of the anchor assembly ring 78 in the positions shown in FIGURE 2 so that the anchor pins 80 can be radially retracted to positions in which their sharpened ends define a diameter less than the internal diameter of line 12, whereby the stopper assembly can be slid through the line 12 without interference from the anchor pins. At the same time the nut 86 and member 88 serve to hold the stopper assembly 24 in its assembled condition. It will also be observed that the forward end of the cam member 88 is spaced apart from the rear end of the cylindrical spacer 74. Therefore, when the cam member 88 is advanced towards the spacer 74, the anchor pins 80 are first actuated to be forced radially into engagement with the line 12. Thereafter, further advancement of the cam member 88 through the anchor assembly ring 78 into engagement with the cylindrical spacer 74 causes compression and expansion of the stopper 70 between the opposed parts 68 and 72.

As is apparent, movement of the actuating nut and cam member in a direction to install the stopper assembly 24 is accomplished by the socket 58 on the inner end of the drive tube 42. After the rod 44 has been utilized to locate the stopper assembly 24 in the desired position upstream from the fitting 14, a wrench is applied to the nut 54 on the rear exposed end of the rod 44 to hold the rod against turning during actuation of the drive tube 42. Another wrench is applied to the flats 56 of drive tube 42 in order to turn the drive tube in a right-hand direction, after the drive tube has been moved upstream relative to the rod 44 in order to place the socket 58 into coupling engagement with the actuating nut 86. Due to the left-hand thread engagement 62—66 of the rod 44 and stopper assembly shaft 60, there is no danger that these members will become uncoupled during the ensuring camming of the anchor pins 80 into engagement with the pipeline 12 and the expansion of stopper 70 into fluid sealing engagement with the pipeline.

After the stopper assembly 24 has been thus installed, the drive tube 42 is withdrawn rearwardly to remove the socket 58 from the actuating nut 86. Thereafter, the wrench applied to the nut 54 of rod 44 is turned in a right-hand direction to uncouple the rod from the stopper assembly 24, after which the actuating mechanism 22 can be removed along with removal of the plug assembly 20. Since the pipeline 12 is now sealed at a predetermined and known position upstream from the fitting 14, the fitting or a segment of pipeline 12 including the fitting can be removed from the pipeline system in order to salvage the fitting 14. If desired, a completion cap can be mounted on the remaining stub of branch line 12 over stopper assembly 24.

While I have shown and described a specific form of my invention, it will be apparent that various changes may be made in the details of construction without departing from the spirit or scope of the invention as defined in the following claims.

I claim:

1. A pipeline tool, comprising: a flexible stopper plug normally capable of insertion to desired position in a pipeline and expansible into sealing engagement with said pipeline, said plug having screw actuated cam means associated therewith for first anchoring said plug in said pipeline and then expanding same into sealing engagement with said pipeline; a removable tool for advancing and expanding said stopper, including an advancing rod detachably connected to said stopper, a sleeve on said rod having a socket for operating said screw actuated cam, and sealing means for sealing against leakage between said rod and sleeve; and mechanism for releasably anchoring and sealing said tool in said pipeline including, a second flexible plug surrounding said sleeve that is normally capable of insertion in said pipeline and is expansible into sealing engagement with said pipeline, sealing means for sealing against leakage between said second plug and sleeve, and mechanism for expanding said second plug into sealing engagement with said pipeline and for releasing said second plug for tool removal.

2. A pipeline tool, comprising: a flexible stopper plug normally capable of insertion to desired position in a pipeline and expansible into sealing engagement with said pipeline, said plug having normally retracted pins associated therewith and screw actuated cam means for first radially extending said pins into engagement with said pipeline to anchor said plug and then to expand said plug into sealing engagement with said pipeline, a removable tool for advancing, anchoring and expanding said stopper, including, an advancing rod detachably connected to said stopper, a sleeve on said rod having a socket for operating said screw actuated cam means, sealing means for sealing against leakage between said rod and sleeve, and mechanism for releasably anchoring and sealing said tool in said pipe including, a second flexible plug surrounding said sleeve that is normally capable of insertion in said pipeline and is expansible into sealing engagement with said pipeline, sealing means for sealing against leakage between said second plug and sleeve, and mechanism for expanding said second plug and for releasing said second plug for tool removal.

3. A pipeline tool, comprising: a flexible stopper plug normally capable of insertion to a desired position in a pipeline and expansible into sealing engagement with said pipeline, said plug having screw actuated cam means associated therewith for anchoring said plug in said pipeline and expanding same into sealing engagement with said pipeline, a removable tool for advancing and expanding said stopper, including an advancing rod detachably connected to said stopper, a tube telescopically mounted on said rod and having a socket on one end for operating said screw actuated cam, sealing means for sealing against leakage between said rod and said tube, a sleeve telescopically mounted on said tube, sealing means for sealing against leakage between said sleeve and said tube, a tubular plug member concentrically mounted on said sleeve that is normally capable of insertion into said pipeline for sealing against leakage between said sleeve and said pipeline, said tubular plug being longitudinally compressible for radial expansion into sealing engagement with said sleeve and said pipeline, and mechanism for longitudinally compressing said tubular plug into sealing engagement with said sleeve and said pipeline and for releasing said tubular plug for tool removal.

4. A pipeline tool, comprising: a solid stopper support shaft, a tubular stopper of an elastomeric material coaxially mounted on and embracing said shaft and normally capable of insertion into a pipeline to be expanded into sealing engagement with said pipeline and shaft to prevent leakage between said pipeline and shaft, an abutment for one end of said stopper affixed to one end of said shaft, the other end of said shaft protruding from the other end of said stopper and mounting a second abutment for movement relative to said shaft, an actuating nut threadedly mounted on said protruding end of said shaft and drivingly engageable with said second abutment to cause longitudinal compression of said stopper to effect sealing engagement of said stopper with said pipeline and said shaft, a plurality of radially extending anchor pins carried by said movable second abutment and adapted for camming engagement with said actuating nut, said pins being normally retracted and movable radially outwardly to forcefully engage said pipeline in response to axial movement of said actuating nut in a direction to expand said stopper, a removable tool for advancing and expanding said stopper, including an advancing rod detachably connected to said protruding end of said shaft, a sleeve on said rod having a socket for operating said actuating nut, and sealing means for sealing against leakage between said rod and sleeve, and mechanism for releasably anchoring and sealing said tool in said pipeline including, a flexible plug surrounding said sleeve and normally capable of insertion in said pipeline and expansible into sealing engagement with said pipeline, sealing means for sealing against leakage between said plug and sleeve, and mechanism for expanding said plug into sealing engagement with said pipeline and for releasing said plug for tool removal.

References Cited in the file of this patent

UNITED STATES PATENTS

| | | |
|---|---|---|
| 1,616,392 | Provost | Feb. 1, 1927 |
| 1,808,411 | Hinkston | June 2, 1931 |
| 2,141,274 | Lenhart | Dec. 27, 1938 |
| 2,374,947 | Nicholson | May 1, 1945 |
| 2,390,461 | Racz | Dec. 4, 1945 |